Oct. 1, 1957 F. L. PAWLOWSKI 2,808,507

RECEIVER CIRCUIT

Filed May 22, 1953 2 Sheets-Sheet 1

INVENTOR.

Frank L. Pawlowski

BY Forman L. Mueller

Atty.

Oct. 1, 1957 F. L. PAWLOWSKI 2,808,507

RECEIVER CIRCUIT

Filed May 22, 1953 2 Sheets-Sheet 2

INVENTOR.
Frank L. Pawlowski
BY
Norman L. Mueller
Atty.

United States Patent Office 2,808,507

Patented Oct. 1, 1957

2,808,507

RECEIVER CIRCUIT

Frank L. Pawlowski, Skokie, Ill., assignor to Motorola, Inc., Chicago, Ill., a corporation of Illinois Application May 22, 1953, Serial No. 356,686

11 Claims. (Cl. 250—20)

This invention relates generally to noise suppression systems, and more particularly to noise squelch circuits for use in communication radio receivers.

It has been found essential in communication receivers to provide a squelch system which mutes the audio output of the receiver in the absence of a carrier wave of the frequency to which the receiver is tuned. The squelch system disclosed and claimed in Noble Patent 2,343,115 issued February 29, 1944, has been used in almost all such receivers for a number of years and is being used at present. In this system, noise signals above the frequency of the audio modulating signals are selected from the output of the frequency modulation discriminator, and are used to control the squelch. The noise signals are greatest when no carrier is received and are reduced due to the limiting action of the receiver in the presence of a carrier wave of the frequency to which the receiver is tuned. Therefore when a carrier is received, the noise voltage will decrease and the voltage so produced is used to control the squelch. This voltage may be used differentially with the limiter voltage which increases when a carrier is received.

The present invention relates to an improvement in the system of the above Noble patent which has been found to be effective in certain applications in highly sensitive communication receivers. Many communication receivers now used have sufficient gain that the signal is brought to the maximum level prior to the final limiter stage so that very little limiting action takes place in this final stage. This results in the limiter current remaining substantially constant whether or not a carrier wave is received. These receivers also provide very high recovery in the discriminator stage which supplies a large voltage to the noise amplifier stage. When a weak modulated signal is received, the voltage derived from the noise selective means may not decrease in the presence of the signal and may actually increase in some cases. Although the frequency modulation receiver does limit and thereby reduces the noise, the effect of noise tends to increase during modulation due to redistribution of sideband energy. Further, the harmonics of the audio frequencies are in the spectrum passed by the noise selecting means, and the noise selecting means is not perfect and therefore passes some of the audio frequencies. Accordingly, the over-all voltage from the noise selecting means may increase due to the modulation as much or more than the noise decreases due to the limiting action. Therefore the voltage produced by the noise selecting means may not decrease when a carrier is received and the squelch may not open.

It is, therefore, an object of the present invention to provide an improved noise operated squelch system for frequency modulation receivers.

A further object of this invention is to provide a squelch system for controlling the audio amplifier of a frequency modulation receiver in accordance with the relative proportions of the modulating signal and noise signals in the output of the discriminator of the receiver.

A further object of the present invention is to provide a squelch system of the noise controlled type wherein the audio signals received are used to counteract the noise voltages to provide more sure release of the squelch in the presence of a received modulated carrier wave.

A feature of this invention is the provision of a squelch system wherein the output from the discriminator, which includes both modulation signals and noise, is first applied to a limiter which is biased so that substantially no limiting takes place when noise alone is applied thereto so that the noise is repeated thereby, and which limits substantially when modulation is present to thereby reduce the noise, with the noise at the output of the limiter being rectified to provide a control voltage which squelches the receiver in the absence of a carrier.

A further feature of this invention is the provision of a squelch system for a frequency modulation receiver in which a first control voltage produced by the relative amplitudes of signal and noise is combined with a reference voltage from the limiter with the voltages combined compensating each other for variations in the power supply voltage so that the threshold of the system remains fixed.

Another feature of this invention is the provision of a squelch system for a frequency modulation receiver as set forth above, which includes transistor stages to thereby conserve space and power in the receiver.

Further objects, features and the attending advantages of the invention will be apparent from a consideration of the following description when taken in connection with the accompanying drawings, in which.

In practicing the invention there is provided a frequency modulation receiver such as is used in radio communications systems which is of the highly selective type having one or more converter stages, amplifier and limiter stages for increasing the gain of the intermediate frequency wave, and a discriminator for deriving the modulation voltage therefrom. The output of the discriminator is applied through a filter which accentuates the high frequencies to an amplifier-limiter stage which is adjusted to limit slightly when there is no modulation of the carrier wave and noise only is developed in the discriminator, and to limit substantially when the output of the discriminator includes a modulating signal. The output of the limiter is applied through a high-pass filter to a rectifier which develops a control voltage. This voltage is used to control the receiver audio stage to block or squelch the stage when the voltage is large, and to allow the stage to operate as an amplifier when the voltage is small. The rectified voltage may be combined differentially with a voltage from the limiter which is increased somewhat in the presence of a carrier wave. The circuit in accordance with the invention may utilize vacuum tubes or may be constructed with transistors to thereby reduce the size and power supply requirements of the system.

Figure 1:
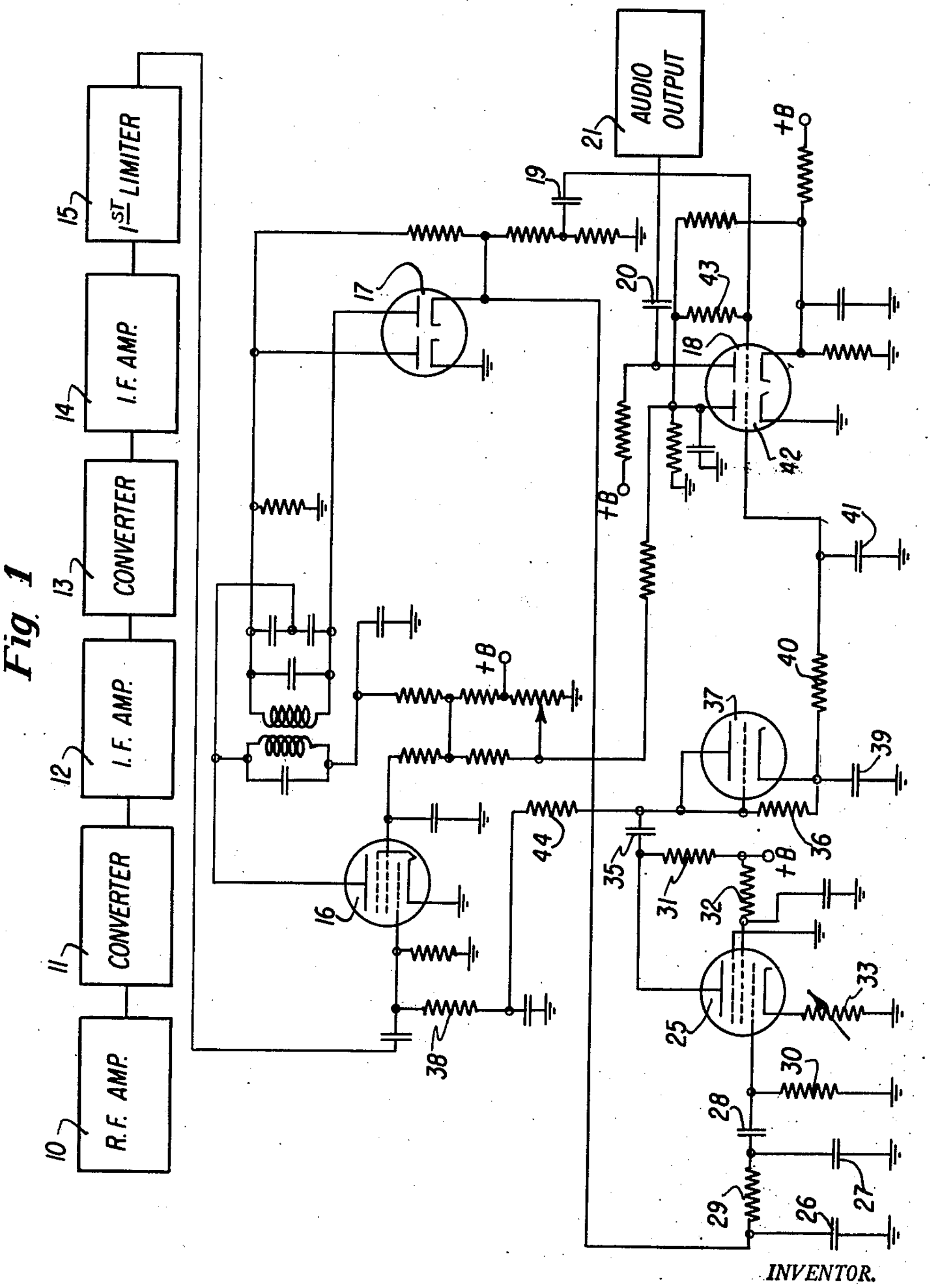
Fig. 1 is a circuit diagram illustrating the invention.

Referring now to the drawings, in Fig. 1 there is illustrated a system in accordance with the invention wherein the receiver includes a radio frequency amplifier 10, first converter 11, first intermediate frequency amplifier 12, second converter 13, second intermediate frequency amplifier 14, and limiter 15. These items may be of standard construction and are hence shown in block diagram form. The converter stages may include separate crystal controlled oscillators. The output of the first limiter is applied to a second limiter which includes the tube 16, and then to a discriminator including the double diode tube 17. The second limiter 16 and discriminator 17 may also be of standard construction, but the circuits thereof are shown in detail since connections to various points thereon are required for operation of the squelch system. The construction of the receiver is such that the signal from the limiter 15 is at substantially the same level at all times. The discriminator 17 has a high recovery and provides the modulating signal at high amplitude to the squelch circuit and the audio output circuit.

Coupled to the discriminator 17 is an audio stage which includes the triode amplifier section 18. The signal is applied from the discriminator through condenser 19 to the grid of the audio amplifier stage 18. The signal is amplified in this stage and applied through condenser 20 to the audio output stage 21. The triode amplifier stage 18 is biased so that it may be blocked to effectively cut off the signal to the audio output stage to thereby squelch the receiver.

The output from the discriminator 17 is also applied to tube 25 which functions as an amplifier and limiter. The signal is first passed through a filter including condensers 26, 27 and 28 and resistors 29 and 30, which passes the modulating signal (audio frequency) and noise frequencies extending in a range above the modulating signal. The filter accentuates the high frequencies so that the noise is passed thereby more efficiently than the modulating signal. As stated above, the level of the signal applied from the discriminator is quite high. The tube 25 has the plate and screen thereof connected to B+ through resistors 31 and 32 respectively, which resistors have very high values to thereby provide low operating voltages for the tube. The cathode of the tube is grounded through resistor 33 which may be variable to provide a variable squelch level. As low operating voltage is applied to the tube 25, this tube operates to limit strong signals so that when a modulation signal is present at the output of the discriminator, this signal and the attending noise are limited in the stage 25.

The output of the tube 25 is applied to a filter including condenser 35 and resistor 36, which form a high-pass filter for selecting noise frequencies above the modulating signal frequencies. The currents passed by this filter are rectified in the tube 37, which is illustrated as a triode with the plate and grid interconnected so that the tube functions as a diode. A reference voltage is also applied to the tube 37, being applied to the plate thereof from resistors 44 and 38 connected to the grid of the second limiter stage 16. This provides a reference voltage which varies slightly under different supply voltage conditions. The output of the rectifier is developed across condenser 39 which together with resistor 40 and condenser 41 form a filter for smoothing the rectified voltage. The direct current control voltage is amplified in the triode section 42 which may be included in the same envelope as the triode section 18, which serves as the audio amplifier. The plate of the triode 42 is connected through resistor 43 to the grid of the triode 18 to provide a controlling bias thereto. The audio signal from the discriminator 17 is also applied to this grid.

Figure 2:
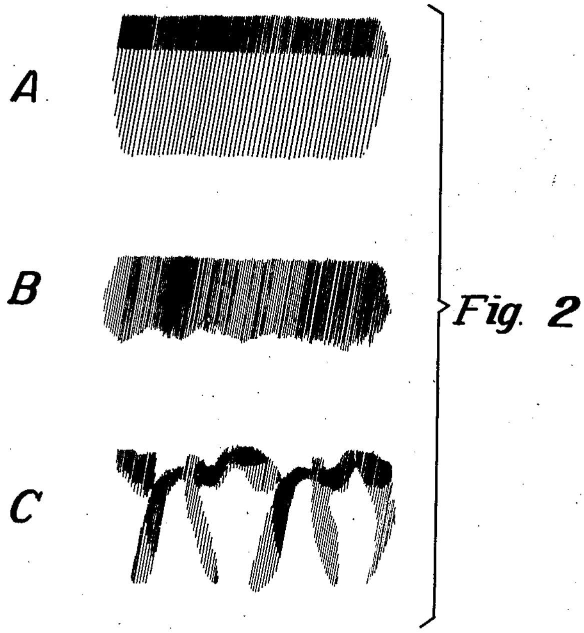
Fig. 2 is a plurality of curves illustrating the operation of the invention.

Reference is made to Fig. 2 which includes curves illustrating the limiting action of the squelch system. Curve A illustrates noise which appears at the output of the limiter in the absence of a signal. Curve B illustrates the reduction in noise resulting from the presence of a weak carrier of the frequency to which the receiver is tuned. Curve C illustrates the signal and noise at the output of the limiter resulting from modulation of the carrier. This curve shows that the average value of the output of the limiter is decreased by modulation. After filtering, curve C has much lower amplitude than curve A so that the control voltage applied to the squelch tube is reduced.

Considering now the operation of the over-all system, when the noise voltage rises above a predetermined value, the bias applied to the grid of the tube 18 blocks this tube so that the audio channel is interrupted. This operates to squelch the receiver to thereby eliminate the reproduction of noise when no signal is received. However, when a signal is received, the action of the limiters of the receiver proper reduces the noise, and the action of the limiter 25 of the squelch system holds the level of signal and noise to a fixed value, so that the noise itself is further reduced. This reduces the noise applied to the rectifier and operates to release the squelch action.

Figure 3:
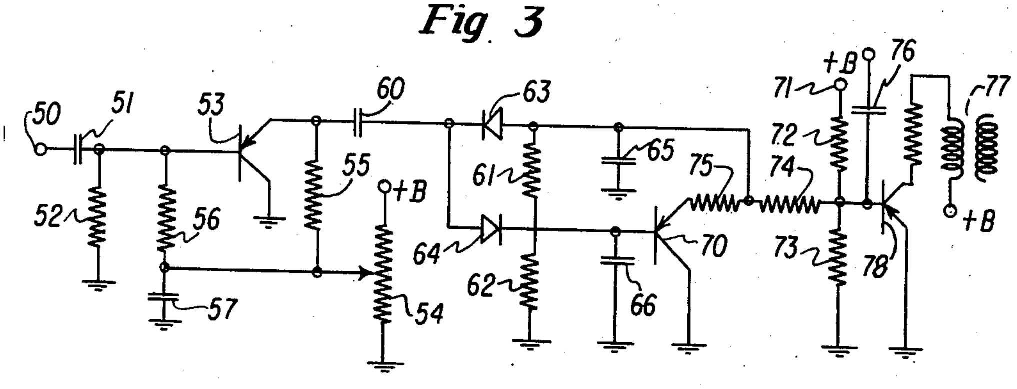
Fig. 3 is a second circuit embodiment of the system in accordance with the invention.

In Fig. 3 there is illustrated a circuit, which functions generally in the same manner as the circuit of Fig. 1, in which transistors are used to provide amplification and limiting in the squelch circuit. The circuit is illustrated for use with junction type transistors, but may also be used with other transistors such as point contact type transistors. In Fig. 3 the modulating signal and noise from the discriminator of the receiver are applied to terminal 50. Condenser 51 and resistor 52 accentuate the high frequencies so that noise is applied to the transistor more efficiently than the audio modulating signal. The transistor 53 functions as an amplifier and limiter and is connected in a grounded collector circuit. Operating potential is applied from a low positive potential indicated +B which may be of the order of 6 volts. A portion of this voltage is derived by the potentiometer 54 and applied through resistor 55 to the emitter electrode, and through resistor 56 to the base electrode of the transistor 53. Condenser 57 provides a bypass for signal frequencies. The operating potentials applied to the transistor 53 is controlled so that this transistor operates as a limiter. The circuit operates in the manner previously described with respect to the corresponding stage of the circuit of Fig. 1.

The signal from the transistor 53 is passed through condenser 60 to the rectifier circuit including crystal diodes 63 and 64, resistors 61 and 62, and condensers 65 and 66. This circuit acts as a high-pass filter to select noise above the modulating signal frequencies, and as a voltage doubler circuit for doubling the noise voltage. The doubled voltage is amplified by transistor 70 which is also connected in a grounded collector circuit and serves as a direct current amplifier. Operating potential is applied from point 71 through the voltage divider including resistors 72 and 73 and through resistors 74 and 75 to the emitter electrode of the transistor 70. The point 71 provides a reference voltage which may be obtained from the limiter of the frequency modulation receiver.

The output derived from the junction between resistors 72 and 73 is applied to the base electrode of transistor 78. This transistor is also connected in a grounded collector circuit with the audio from the discriminator being applied to the case electrode thereof through the condenser 76. The output is derived from the emitter electrode which may be connected through transformer 77 to the B+ source.

As set forth above, the circuit of Fig. 3 operates in the same general manner as the circuit of Fig. 1. The combined signal from the discriminator is applied to the amplifier and limiter which limits substantially when modulation is received. The output of the limiter is applied to a selective filter which selects noise at frequencies above that of the modulating signal. The noise voltages are rectified and amplified and applied as a bias for the audio amplifier stage to block the stage when the noise signals predominate. This operates to squelch the receiver when no carrier is received.

I claim:

1. In a frequency modulated radio receiving system which includes carrier wave selecting and converting apparatus, amplitude limiting apparatus, frequency discriminating apparatus and signal reproducing apparatus serially included in said system in the order named to form a receiving channel, and which system limits the amplitude of a received signal modulated carrier wave and detects and reproduces the modulation signal components thereof, said apparatus being operative to transmit noise appearing in said channel, the noise squelch system including in combination, limiter means, means accentuating the higher frequencies for applying modulation signals and noise from said frequency discriminating apparatus to said limiter means, high pass filter means coupled to said limiter means for selecting noise at frequencies above the modulation signal frequencies at the output of said limiter means, means coupled to the amplitude limiting apparatus for deriving a first control voltage therefrom, means coupled to said last-named means and to said high-pass filter means for rectifying the noise selected by said filter means for producing a second control voltage of opposite polarity to said first control voltage and for differentially combining said first and second control voltage to produce a third control voltage, and squelch means for controlling said signal reproducing apparatus to prevent the same from responding to noise or signals appearing in said channel so long as said third control voltage exceeds a predetermined value.

2. In a frequency modulated radio receiving system which includes carrier wave selecting and converting apparatus, amplitude limiting apparatus, frequency discriminating apparatus and signal reproducing apparatus serially included in said system in the order named to form a receiving channel, and which system limits the amplitude of a received signal modulated carrier wave and detects and reproduces the modulation signal components thereof, said apparatus being operative to transmit noise appearing in said channel in the total absence of a received signal carrier, the noise squelch system for preventing reproduction of noise including in combination, limiter means, means accentuating the higher frequencies for applying modulation signals and noise from said frequency discriminating apparatus to said limiter means, said limiter means being biased to pass noise applied thereto alone without substantial limiting thereof and to substantially limit modulation signals and noise when applied together thereto, high pass filter means connected to said limiter means and constructed to pass frequencies above the modulation signal frequencies to thereby select noise appearing at the output of said limiter means, means coupled to the amplitude limiting apparatus for deriving a first control voltage therefrom which increases when a carrier wave is received, means coupled to said last named means and to said high pass filter means for rectifying the noise selected by said filter means to thereby produce a second control voltage of opposite polarity to said first control voltage and for differentially combining said first and second control voltage to produce a third control voltage, amplifier means for amplifying said third control voltage, and squelch means connected to said amplifier means for controlling said signal reproducing apparatus to prevent the same from responding to noise or signals appearing in said channel so long as said amplified control voltage exceeds a predetermined value.

3. In a mobile frequency modulated radio receiving system for operating from a vehicle power supply which is subject to variations in the voltage thereof, which receiving system includes carrier wave selecting and converting apparatus, amplitude limiting apparatus, frequency discriminating apparatus and signal reproducing apparatus serially included in said system in the order named to form a receiving channel, and which system limits the amplitude of a received signal modulated carrier wave and detects and reproduces the modulation signal components thereof, said apparatus being operative to transmit noise appearing in said channel, the noise squelch system including in combination, limiter means, means accentuating the higher frequencies for applying modulation signals and noise from said frequency discriminating apparatus to said limiter means, high pass filter means coupled to said limiter means for selecting noise at frequencies above the signal frequencies at the modulation output of said limiter means, means coupled to the amplitude limiting apparatus for deriving a first control voltage therefrom, means coupled to said last-named means and to said high pass filter means for rectifying the noise selected by said filter means for producing a second control voltage of opposite polarity to said first control voltage and for differentially combining said first and second control voltage to produce a third control voltage, said first and second control voltages varying in opposite sense to variations in the power supply voltage so that said third voltage is substantially independent of said variations, and squelch means for controlling said signal reproducing apparatus to prevent the same from responding to noise or signals appearing in said channel so long as said third control voltage exceeds a predetermined value.

4. In a frequency modulated radio receiving system which includes carrier wave selecting, amplitude limiting, frequency discriminating and signal reproducing apparatus serially included in said system in the order named, which system limits the amplitude of a received signal modulated carrier wave and detects and reproduces the modulation signal components thereof, said apparatus being operative to transmit noise appearing in said channel in the total absence of a received signal carrier, the noise squelch system including in combination, a limiter stage including a first transistor, means for applying modulation signals and noise from said frequency discriminating apparatus to said limiter stage, means coupled to said limiter stage for selecting noise at the output thereof having a frequency above the frequency of said modulation signals, means coupled to said noise selecting means for rectifying the noise selected thereby to produce a control voltage, a control stage including a second transistor connected between the frequency discriminating apparatus and the signal reproducing apparatus, and means for applying said control voltage to said control stage for blocking said control stage and thereby disable the signal reproducing means when said control voltage exceeds a predetermined value.

5. In a frequency modulated radio receiving system which includes carrier wave selecting and amplitude limiting apparatus, frequency discriminating apparatus for detecting modulation signals, and signal reproducing apparatus serially included in said system in the order named, and which limits the amplitude of a received signal modulated carrier wave and detects and reproduces the modulation signal components of the received carrier wave, said apparatus being operative to transmit noise appearing in the receiving system in the absence of a received carrier wave, the noise squelch system including in combination, second limiting means limiting the amplitude of signals applied thereto and having an output providing a given maximum amplitude, means for applying modulation signals and noise from the frequency discriminating apparatus to said second limiting means, means coupled to said output of said second limiting means for selecting noise at said output, and means coupled to said noise selecting means and controlled by the noise selected thereby for preventing the signal reproducing apparatus from responding to noise or signals from the discriminating apparatus so long as the noise at the output of said limiting means exceeds a predetermined value.

6. A noise squelch system in accordance with claim 5 wherein said noise selecting means selects signals at the output of said second limiting means having a frequency above the frequency of said modulation signals, and said means coupled to said noise selecting means includes means for rectifying the noise selected to produce a control voltage and squelch means for controlling said signal reproducing apparatus to prevent the same from responding to noise or signals from the discriminating apparatus so long as said control voltage exceeds a particular value.

7. A noise squelch system in accordance with claim 5 wherein said means coupled to said noise selecting means includes rectifying means for rectifying the noise selected to produce a control voltage, amplifier means coupled to said rectifying means for amplifying said control voltage, and squelch means coupled to said amplifier means for controlling the signal reproducing apparatus to prevent the same from responding to noise or signals from the frequency discriminating apparatus so long as said amplified control voltage exceeds a particular value.

8. A noise squelch system in accordance with claim 5 wherein said second limiting means includes a first transistor, and said means coupled to said noise selecting means includes means for rectifying the noise selected to produce a control voltage and a control stage including a second transistor connected between the frequency discriminating apparatus and the signal reproducing apparatus, and in which said control stage responds to said control voltage which blocks said control stage and thereby disables the signal reproducing means when said control voltage exceeds a particular value.

9. In a frequency modulated radio receiving system which includes carrier wave selecting, amplitude limiting, frequency discriminating and signal reproducing apparatus serially included in said system in the order named, and which limits the amplitude of a received signal modulated carrier wave and detects and reproduces the modulation signal components of the received carrier wave, said apparatus being operative to transmit noise appearing in the receiving system in the absence of a received carrier wave, the noise squelch system including in combination, a vacuum tube repeater stage, means for applying modulation signals and noise from the discriminating apparatus to said repeater stage, biassing means for said stage applying operating potential thereto so that signals applied thereto are limited in amplitude to a given level below the level of noise transmitted in the system in the absense of a received carrier wave so that such noise is limited in amplitude thereby and larger signals including modulated signals and noise applied to said stage when a carrier wave is received are limited in amplitude a greater amount to said given level, means coupled to said repeater stage for selecting noise at the output thereof, and means coupled to said noise selecting means and controlled by the noise selected thereby for preventing said signal reproducing apparatus from responding to noise or signals from the discriminating apparatus so long as the noise at the output of said repeater stage exceeds a predetermined value.

10. In a frequency modulated radio receiving system which includes carrier wave selecting and converting apparatus, amplitude limiting apparatus, frequency discriminating apparatus and signal reproducing apparatus serially included in said system in the order named, and which system limits the amplitude of a received signal modulated carrier wave and detects and reproduces the modulation signal components thereof, said apparatus being operative to transmit noise appearing in the receiving system in the total absence of a received carrier wave, the noise squelch system including in combination, second limiting means limiting the amplitude of signals applied thereto and having an output providing a given maximum amplitude, means accentuating the higher frequencies for applying modulation signals and noise from said frequency discriminating apparatus to said second limiting means, high pass filter means which passes only frequencies above the modulation signal frequencies coupled to said output of said second limiting means for selecting noise at the output thereof, means coupled to said high pass filter means for rectifying the noise selected thereby to produce a control voltage, and squelch means for controlling said signal reproducing apparatus to prevent the same from responding to noise or signals from the frequency discriminating apparatus so long as said control voltage exceeds a particular value.

11. The noise squelch system in accordance with claim 10 wherein said second limiting means includes a first transistor, said rectifying means includes voltage doubler means producing a control voltage and a direct current amplifier stage including a second transistor coupled to said voltage doubler means for amplifying said control voltage, and said squelch means includes a third transistor connected between the frequency discriminating apparatus and the signal reproducing apparatus, said direct current amplifier stage being connected to said squelch means for applying said amplified control voltage thereto to block said squelch means and thereby disable the signal reproducing means when said amplified control voltage exceeds the particular value.

References Cited in the file of this patent

UNITED STATES PATENTS

| | | |
|---|---|---|
| 2,420,518 | Brown | May 13, 1947 |
| 2,527,617 | Berger | Oct. 31, 1950 |
| 2,533,543 | Young | Dec. 12, 1950 |
| 2,588,031 | O'Brien et al. | Mar. 4, 1952 |